(12) United States Patent
Bokka

(10) Patent No.: US 9,182,989 B1
(45) Date of Patent: Nov. 10, 2015

(54) SYSTEM AND METHOD FOR RECEIVING SERVICES PROVIDED BY DISTRIBUTED SYSTEMS

(71) Applicant: Charles Schwab & Co., Inc., San Francisco, CA (US)

(72) Inventor: Ramakrishna V. Bokka, San Ramon, CA (US)

(73) Assignee: Charles Schwab & Co., Inc., San Francisco, CA (US)

( * ) Notice: Subject to any disclaimer, the term of this patent is extended or adjusted under 35 U.S.C. 154(b) by 311 days.

(21) Appl. No.: 13/931,898

(22) Filed: Jun. 29, 2013

Related U.S. Application Data

(60) Provisional application No. 61/666,851, filed on Jun. 30, 2012.

(51) Int. Cl.
G06F 9/45 (2006.01)
G06F 9/30 (2006.01)

(52) U.S. Cl.
CPC .................................. G06F 9/30174 (2013.01)

(58) Field of Classification Search
None
See application file for complete search history.

(56) References Cited

U.S. PATENT DOCUMENTS

| | | | | |
|---|---|---|---|---|
| 7,404,177 B1* | 7/2008 | Greenfield et al. | ........... | 717/106 |
| 8,387,033 B2* | 2/2013 | Gordy et al. | .................. | 717/149 |
| 8,387,034 B2* | 2/2013 | Gordy et al. | .................. | 717/149 |
| 8,533,690 B2* | 9/2013 | McAtamney | ................. | 717/137 |
| 8,645,932 B2* | 2/2014 | Wright et al. | ................. | 717/146 |
| 8,806,453 B1* | 8/2014 | Bodkin et al. | ................ | 717/137 |
| 8,843,909 B2* | 9/2014 | Tondreau et al. | ............. | 717/149 |
| 2004/0181783 A1* | 9/2004 | Nagata et al. | ................. | 717/137 |
| 2005/0039173 A1* | 2/2005 | Tondreau et al. | ............. | 717/136 |
| 2006/0130003 A1* | 6/2006 | Dasari et al. | .................. | 717/131 |
| 2011/0138350 A1* | 6/2011 | Naik et al. | ..................... | 717/100 |
| 2011/0289490 A1* | 11/2011 | McAtamney | ................. | 717/137 |
| 2012/0096444 A1* | 4/2012 | Wright et al. | ................. | 717/137 |

* cited by examiner

*Primary Examiner* — Don Wong
*Assistant Examiner* — Roberto E Luna
(74) *Attorney, Agent, or Firm* — Innovation Partners; Charles E. Gotlieb

(57) ABSTRACT

A system and method allows a legacy program to call a distributed service in the manner of the legacy program calling another legacy program. The call is translated and sent to the distributed system in a secure manner, with potential timeout issues potentially handled faster than would be handled by the distributed system, and the response is returned to the legacy program in the format that another legacy program would have used.

18 Claims, 6 Drawing Sheets

SYSTEM AND METHOD FOR RECEIVING SERVICES PROVIDED BY DISTRIBUTED SYSTEMS

RELATED APPLICATION

This application claims the benefit of U.S. Provisional Patent Application Ser. No. 61/666,851, entitled, "Method and Apparatus for Receiving Services Provided by Distributed Systems" filed by Ramakrishna V. Bokka on Jun. 30, 2012, having the same assignee as the present application and is incorporated by reference in its entirety.

FIELD OF THE INVENTION

The present invention is related to computer software and more specifically to computer software for distributed systems.

BACKGROUND OF THE INVENTION

Distributed systems are computer systems that perform services over a network. Legacy programs are programs written for a mainframe computer system or other similar computer system, and written in an early third generation language such as COBOL or FORTRAN. What is needed is a system and method that allows legacy programs to call distributed services without compromising the security of the legacy system or requiring it to wait as long as a distributed services system can provide an indication of a timeout or other error.

SUMMARY OF INVENTION

A system and method allows legacy programs running on legacy systems to call distributed services available via a network, such as the Internet, by calling what appears to be another legacy program, making the calling of a distributed service as easy as the calling of another legacy program, even though it is not a legacy program, i.e. a program written in a legacy language such as COBOL. As used herein, a distributed service may refer to any remote distributed service reachable via a LAN or the Internet or other network.

For each distributed service, an identifier of the distributed service, referred to as a distributed service key, is received, along with location information for the distributed service, and a type of that distributed service. For each type of distributed service, translation information is received that describes how to translate parameters received in the format of the programming language of the legacy program into parameters in the format understood by that type of distributed service, and also describes how to translate the response from the distributed service in the reverse direction.

When a legacy program determines the need for a use of a distributed service, the legacy program identifies the service key of that distributed service, which would be programmed into the legacy program. Additionally, the legacy program builds any parameters it will provide as input to the distributed service into a data structure that would be used to call another legacy program in the same programming language (e.g. COBOL Copybook) and calls a wrapper program written in that same language with the service key and the input parameters.

The wrapper program formats the service key into an ASCII-formatted HTTP header, also including the format of the input parameters and the format of the attached HTTP payload in the HTTP header, and attaches the input parameters as the payload to an HTTP message containing that header. The wrapper provides the HTTP message to an HTTP client program that runs on the legacy system. The HTTP client connects to the translator via the translator's intermediary device, and forwards such HTTP message to the translator's intermediary. The intermediary handles secure communications with the legacy system, timeouts, and other issues as described in more detail below, and forwards appropriate messages to the translator. The translator uses the service key to identify the translation information to use to adapt the input parameters into the format specified by the distributed service, translates the input parameters according to such translation information, and calls the distributed service using a protocol also specified by the translation information. Certain parameters may also be added or changed by the translator according to the translation information received as described above, and included as part of the parameters provided to the distributed service. The translator stores the request associated with the distributed service key or destination IP address and port of the distributed service. As used herein, an IP address may be a virtual IP address or a real IP address.

The distributed service investigates the request and identifies if there are communication errors that may be corrected by resending some or all of the request. If so, the distributed service so indicates to the translator, which resends the portion or the entire request. The distributed service attempts to process the request, and provides to the translator a response, which may indicate that the request was processed successfully, along with the expected response, or may indicate an error. The translator receives the response, identifies the translation information corresponding to the distributed service from which the response was received, and translates the response into a format that the legacy program would receive if the distributed service had been written in the same programming language as the legacy program. Parameters may be added to, or changed in, the response by the translator as part of this translation, in accordance with the translation information received. The translator provides the translated response in an HTTP response message payload to the wrapper, via the translator's intermediary and the HTTP client on the legacy system. Any errors are translated into HTTP errors by the translator.

The wrapper investigates the response message, and determines whether the response message contains errors. If the response message contains errors, the wrapper converts the errors into those that would be understood by the legacy program and provides the response thus converted to the legacy program in the same format that would be used by another legacy program. If the response does not contain errors, the wrapper provides the payload to the legacy program in a format that would have been used to provide a response from another legacy program written in the same language as the legacy program to the legacy program.

The translator's intermediary ensures communications are secure into and out of a legacy system when a legacy program on that system calls a distributed service. It receives its own public and private key certificates, as well as the public keys for any legacy systems. Additionally, the translator's intermediary receives the service keys corresponding to distributed services that the translator may call when so requested by a legacy program.

The legacy system and the translator's intermediary are authenticated to each other and a secure connection is established between the two systems. When a legacy program uses the secure connection to request a distributed service call via the translator, the translator's intermediary receives the request and investigates it. If the request is not valid request from an approved legacy system for a valid distributed service, then the intermediary rejects the request and notifies the calling legacy program (via its HTTP client and wrapper) that the request is rejected.

If the request is a valid request, then the intermediary disguises the identity and/or location of the calling legacy system and program and then forwards the request to the translator, also recording the date and time of when such request was forwarded.

For a specified length of time, the intermediary listens for a response for the distributed service call it has forwarded. If no response is received for the forwarded call within the given amount of time, then the intermediary generates an HTTP timeout error message and sends the timeout error message to the legacy program that attempted to make the call via the wrapper used by the legacy program and the legacy system's HTTP client.

If a response is received for the forwarded call within the specified time period, then the translator's intermediary receives the response and forwards it to the appropriate legacy system via the wrapper used by the legacy program and the legacy system's HTTP client.

DETAILED DESCRIPTION OF A PREFERRED EMBODIMENT

Figure 1:
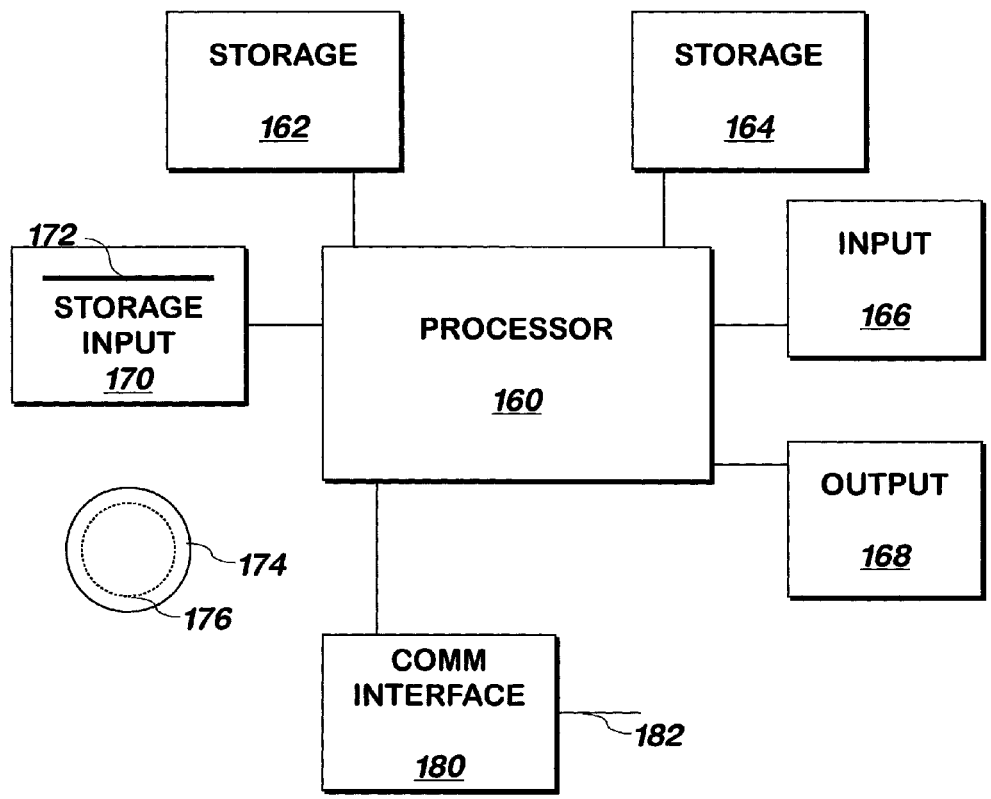
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Any number of processors 160 may be used for implementing the present invention as described herein. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. All storage elements described herein as storage may include conventional disk or memory storage and may include a conventional database. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional IBM SYSTEM Z computer system running the conventional Z/OS commercially available from IBM CORPORATION of Armonk, N.Y., SUN MICROSYSTEMS T SERIES SERVER running the SOLARIS operating system commercially available from ORACLE CORPORATION of Redwood Shores, Calif., a PENTIUM-compatible personal computer system such as are available from DELL COMPUTER CORPORATION of Round Rock, Tex. running a version of the WINDOWS operating system (such as XP, VISTA, or 7) commercially available from MICROSOFT Corporation of Redmond Wash. or a Macintosh computer system running the MACOS or OPENSTEP operating system commercially available from APPLE INCORPORATED of Cupertino, Calif. and the FIREFOX browser commercially available from MOZILLA FOUNDATION of Mountain View, Calif. or INTERNET EXPLORER browser commercially available from MICROSOFT above, although other systems may be used. Each computer system 150 may be a DROID 2 mobile telephone commercially available from MOTOROLA CORPORATION of Schaumberg, Ill. running the ANDROID operating system commercially available from GOOGLE, INC. of Mountain View, Calif. Various computer systems may be employed, with the various computer systems communicating with one another via the Internet, a conventional cellular telephone network, an Ethernet network, or all of these.

For Each Distributed Service: Translator Receives Service Key, Service Location, Service Type, Protocol of Distributed Service, and Translation Requirements of Types.

Figure 2A:
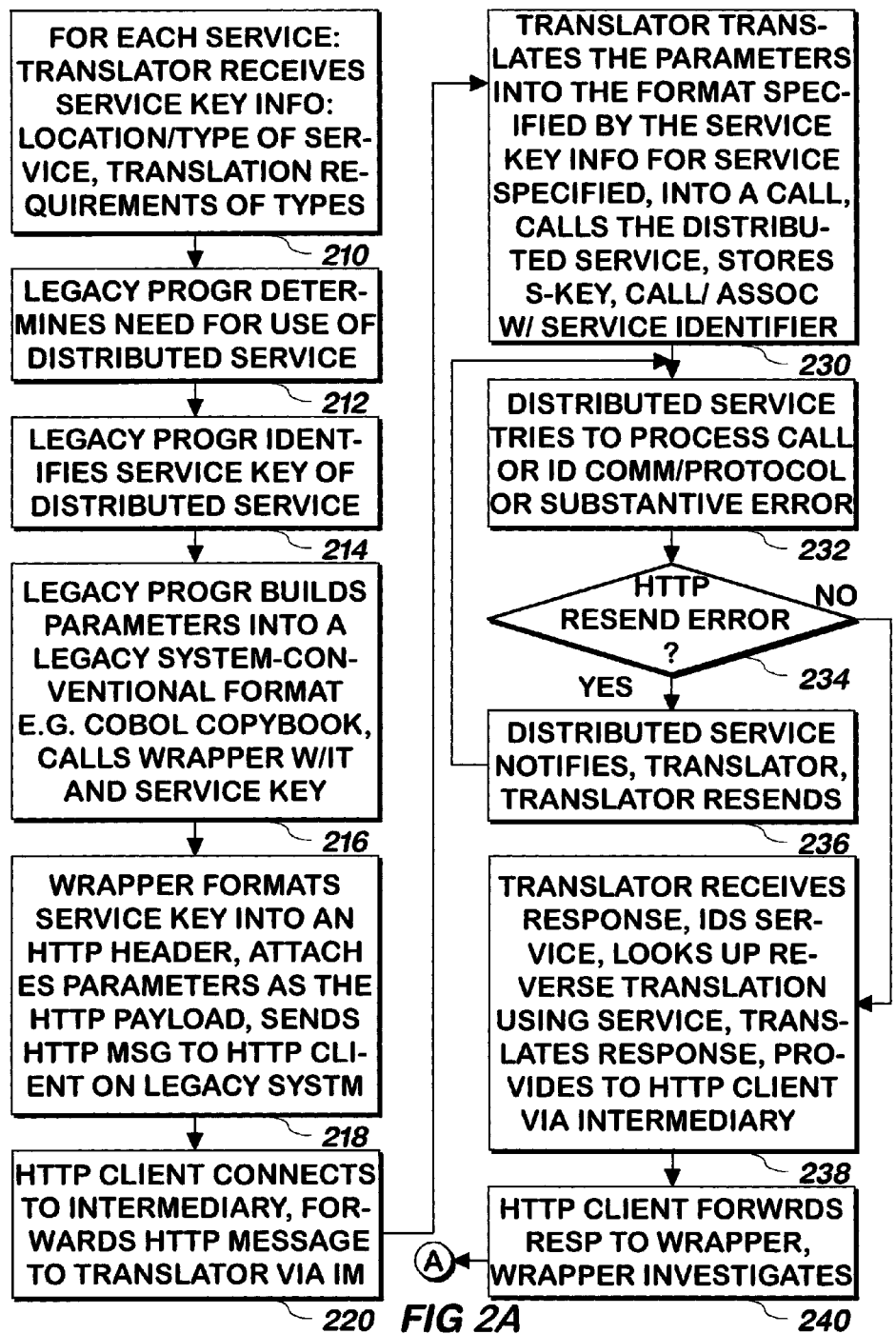
FIG. 2, consisting of FIGS. 2A and 2B, is a flowchart illustrating a method of calling a distributed service on one computer system from a legacy program on a different computer system over a network according to one embodiment of the present invention.
FIG. 2C is a flowchart illustrating a method of forwarding secure communications between a legacy system and a translator and back according to one embodiment of the present invention.
Figure 2B:
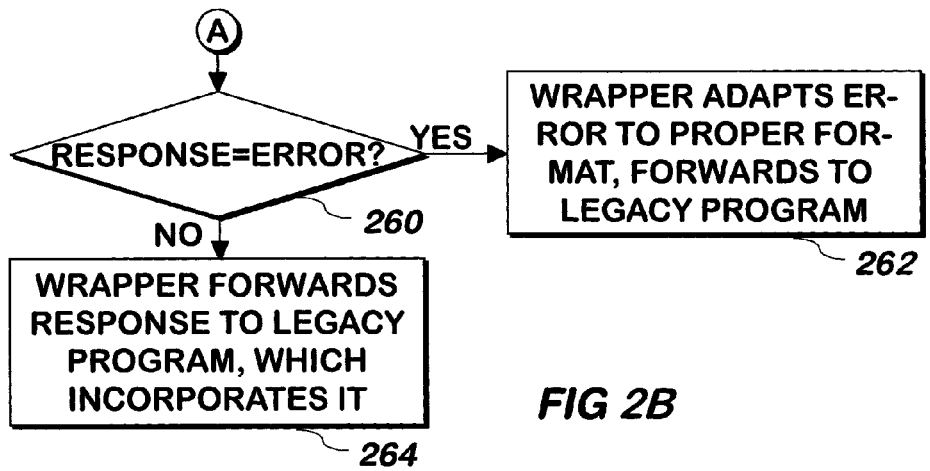

FIG. 2, consisting of FIGS. 2A and 2B, is a flowchart illustrating a method for facilitating communications between legacy programs and distributed services via a translator according to one embodiment of the present invention. As used herein, a distributed service is any service that supports a remote interface via a network, including web services, RESTful services, FTP, DOCNET remote, and Java Remote. Referring now to FIG. 2, service key information corresponding to any number of distributed services is received 210 at a translator system, such as from a system administrator. In one embodiment, service key information corresponding to any distributed service may include a unique service key, as well as one or more service locations, the protocol that should be used to call the distributed service, and an identifier of the service type associated with such service key. In one embodiment, service location information corresponding to a distributed service may include a host ID or an IP address or virtual IP address and port number information corresponding to such service. As used herein, IP address information may include conventional IP address information, virtual IP address information, and/or host ID information.

Additionally at step 210, translation requirements corresponding to any number of service types may be received as part of the service key information. Translation requirements corresponding to a distributed service type may include any information used to translate legacy program output that will be sent to the distributed system having the indicated type, including any legacy program-supplied parameters, into an alternative format as specified by any number of distributed service(s), associated with such distributed service type, when such service is called using legacy program. In one embodiment, legacy programs (which may be second-generation programming languages, e.g. COBOL on a mainframe) may be written in any language that does not allow direct calling to the distributed service being called.

Legacy Program Determines Need For Use of Distributed Service.

A determination is made by a legacy program that the use of a distributed service is needed or desired by the legacy program 212. In one embodiment, use of a distributed system may be determined to be needed when the legacy code running the legacy program calls for it. For example, when a COBOL program on a mainframe receives GPS coordinates and is requested to provide a map corresponding to such GPS coordinates, the COBOL program may determine that use of a distributed service, such as one that receives GPS coordinates and returns a reference to a map corresponding to such coordinates, is needed or desired.

Legacy Program Identifies Service Key of Distributed Service.

The service key corresponding to the distributed service which is needed or will be used by the legacy program is identified as part of step 212, such as via the conventions of the programming language used to write such legacy program.

Legacy Program Builds Parameters into a Legacy Program-Conventional Format, i.e. COBOL COPYBOOK, Calls Wrapper with it and Service Key.

Any parameters specified by the distributed service that the legacy program is going to call as described herein are built by the legacy program in a format that is conventional to the legacy program, and using such legacy program language conventional parameters and the identified service key, a wrapper is called by the legacy program 216. In one embodiment, the wrapper called by the legacy program is a separate program written using the same programming language as the language used to write the legacy program; therefore, no special techniques outside of conventional program-calling techniques of the legacy code are required to call it. For example, a COBOL program may build parameters into a conventional COBOL COPYBOOK format and use the COBOL COPYBOOK to call the wrapper, along with the service key. The wrapper may be called by any of several legacy programs that may call any distributed service, which may be the same as, or different from, those called by another legacy program as described herein.

Wrapper Formats Service Key into an HTTP Header, Attaches Parameters as the HTTP Payload, Sends HTTP Message to HTTP Client on Legacy System.

The service key included with the call to the wrapper is formatted by the wrapper into a conventional HTTP header using ASCII encoding, and the parameters included with the call to the wrapper are attached to the HTTP header as an HTTP payload in the same format in which the wrapper received them, and such HTTP message is sent by the wrapper to an HTTP client on the legacy system 218. In one embodiment, the HTTP header, which is in ASCII format and includes conventional HTTP header information, also includes format information corresponding to the type of parameters included in the HTTP payload (e.g. COBOL COPYBOOK) as well as the format of the HTTP payload of the HTTP message (e.g. EBCDIC or ASCII). The format may be explicitly specified to the wrapper by the legacy program, or it may be implied by the calling program.

HTTP Client Connects to Intermediary, and Intermediary Forwards Request to Translator.

The HTTP client on the legacy system receiving the HTTP request from the wrapper is connected to an intermediary via one or more conventional networks, and the HTTP request is forwarded by the HTTP client to the translator via the intermediary as described below with respect to FIG. 2C 220. In one embodiment, the HTTP client on the legacy program may be written in an alternate programming language from the legacy program. For example, the HTTP client may be written in C to maximize communication speeds.

In one embodiment, the intermediary between the HTTP client and the translator may be part of the translator system, and such intermediary handles communication and security issues of the translator as described below with respect to FIG. 2C. The intermediary, which receives communications from the legacy system may authenticate itself to the legacy system at startup of either system.

Translator Translates Parameters into the Format Specified by the Service Key Information for Service Specified, into a Call, Calls the Distributed Service, Stores Service Key and Call Associated with Service Identifier.

The translator receives the message, the service type corresponding to the received service key is identified, and using translation requirements corresponding to such identified service type, the parameters received in the HTTP payload of the received HTTP request are translated by the translator from the format conventional to the legacy program into the format specified by the distributed service corresponding to the received service key, and such distributed service is called by the translator using the translated parameters and the protocol specified by the service key 230. In one embodiment, translation of received input parameters may include conversion of any EBCDIC characters to ASCII characters if the HTTP header indicates it is encoded in EBCDIC, and any tables or information corresponding to such character conversion may be received and stored by the translator along with service key information as part of step 210 above or they may be internally stored by the translator.

In one embodiment, the service key specifies one service and service type, but each type of service may be specified by one or more service keys. The translation specifications are made for each service type. Thus, translating parameters involves identifying the service type for the service key and translating according to the specifications for that type.

In one embodiment, the call to the distributed service may be made using the service location (e.g. IP address and port) corresponding to the received service key, and the call to the distributed service is also stored 230 by the translator with a unique service call identifier, which in one embodiment may be the service location of the distributed service, as well as the received service key corresponding to the distributed service that has been called.

Distributed Service Attempts to Process Call or Identify any Communication Error or Substantive Error.

When called, the distributed service attempts to process the call and/or identify any communication or data protocol error (for example an error in which some of the communication as received incorrectly and for which a request to resend may be provided to correct the error), or any substantive error 232.

If Communication Error, Distributed Service Notifies Translator, Translator Resends.

If a communication error is identified at the distributed service 234, then the translator is notified of such communication error, and the translator may be notified to resend any missing packets 236. Any such missing packets or information are re-sent to the distributed service by the translator from those stored as described above 236. The method continues at step 232.

If No Communication Error, Translator Receives Response, Identifies Service Call, Looks Up Reverse Translation Using Service Call, Translates Response, Provides to HTTP Client Via Intermediary.

If no communication error is identified at the distributed service 234, then a response provided to the translator from the distributed service is received at the translator, and the translator reverse translates the response and provides the reverse translated response as an HTTP message to the HTTP client from which the request was received via the intermediary 238. In one embodiment, when the response is received, the service call identifier corresponding to the received response is identified (e.g. using the source IP address and port to identify the type of translation) and translation information corresponding to the identified service call that were received as part of step 210 may be used to reverse translate the received response back into the format of the legacy programming language originally used to request the distributed service (e.g. back to COBOL COPYBOOK format, if the calling program is running COBOL), and the reverse translated response is forwarded in the payload of an HTTP message by the translator via the intermediary, as described below with respect to FIG. 2C, to the HTTP client from which the request from the legacy program was received.

In one embodiment, the response may be received from the distributed service as an indication of a substantive-type error, and in such a case, the translator converts the received error response into an HTTP error code using the translation information identified as described above and sends the HTTP error code via the intermediary to the HTTP client from which the request from the legacy program was received.

HTTP Client Forwards Response to Wrapper.

The HTTP client on the legacy system receives the HTTP response from the translator via the intermediary and forwards the reverse translated response in the HTTP payload of the message to the wrapper from which it previously received the HTTP request as described above in the form of a response to such request 240.

If Response Received is an Error, then Wrapper Adapts Error to Proper Format and Forwards to Legacy Program.

The wrapper investigates the response as part of step 240. If the response received at the wrapper from the HTTP client is a substantive error message or HTTP error code 260, then the wrapper adapts the error message into the proper legacy program language format and forwards the formatted error to the legacy program that called it 262. Adapting the response may include converting error codes from HTTP or other types of error codes to those of the legacy programming language. In one embodiment, all communications for a given legacy system are assumed to be in the same legacy programming language, and so the wrapper on a legacy system will always adapt the response in the same way for each legacy program though other techniques may be used in other embodiments. A wrapper on a different legacy system may assume a different legacy system programming language.

If Response Received is not an Error, then Wrapper Forwards Response to Legacy Program.

If the response received at the wrapper from the HTTP client is not an error message 260, then the wrapper forwards the received response to the legacy program from which it received the call in a format appropriate to the legacy program 264. The legacy program incorporates the response into an output, for example, by providing it to a user.

As noted above, communications may be forwarded from an HTTP client on a legacy system to a translator via an intermediary, and vice versa. FIG. 2C is a flowchart illustrating a method of an intermediary forwarding secure communications between legacy programs and a translator according to one embodiment of the present invention.

Intermediary Receives its Own Public/Private Keys and Public Key of Legacy System.

Figure 2C:
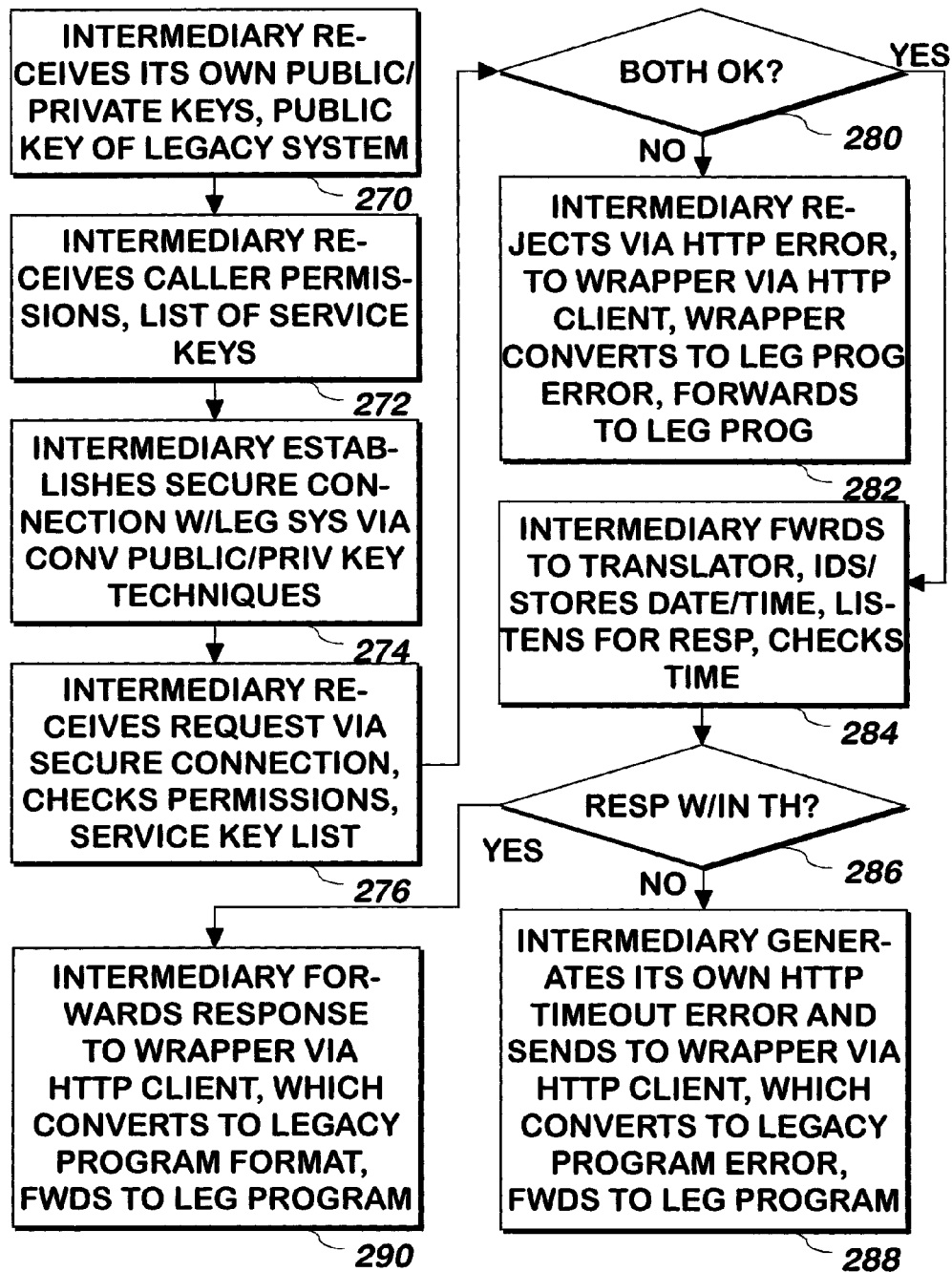

Referring now to FIG. 2C, at any time, digital certificates information, including public and/or private keys, corresponding to the intermediary may be received at the intermediary, and public keys corresponding to any number of legacy systems may also be received at the intermediary via conventional digital certificate exchange techniques 270. In one embodiment, the intermediary may be part of the same system as the translator, and the system including the intermediary and translator may communicate with a legacy system via a LAN or any other network.

Intermediary Receives Caller Permissions, List of Service Keys.

Caller permissions and available distributed services information are received and stored at the intermediary 272. In one embodiment, caller permissions may be received as a list of IP addresses of legacy system identifiers and specify which legacy systems are permitted to call distributed services via the intermediary and translator, and available distributed services information may include a service key list specifying which service keys corresponding to distributed services are known to the intermediary and translator and may be called by a legacy system via the intermediary and translator in the manner described herein.

Intermediary Establishes Secure Connection with Legacy System Via Conventional Public/Private Key Techniques.

Using conventional public/private key techniques, one or more secure connections are established 274 between the intermediary and each of any number of legacy systems.

Intermediary Receives Request Via Secure Connection, Checks Permissions and Service Key List.

Once a secure connection has been established between the intermediary and a legacy system, at any time, a call request (i.e. request to call a distributed service as described herein) may be received at the intermediary from the legacy system, and, when such a call request is received, caller permissions are checked, and the service key list is also checked, by the intermediary 276. In one embodiment, the call request includes the service key corresponding to the distributed service being called and is received at the intermediary when it has been forwarded to the intermediary, via the secure connection, by the HTTP client on the legacy system in the manner described above. When the call request is received, the calling legacy system is identified, such as via the secure connection, and caller permissions are checked to determine whether the calling legacy system is one which is permitted to make such a call request, and the service key list is checked to determine whether the service key included with the call request corresponds to a distributed service that is able to be called via the intermediary and translator.

If Permissions and Service Key List are not Both Okay, then Intermediary Rejects Via HTTP Error to Wrapper Via HTTP Client, Wrapper Converts to Legacy Program Error and Forwards to Legacy Program.

If a determination is made that the calling legacy system is not permitted to make distributed service calls, or if the service key included with the call request is not included in the service key list 280, then the call request is rejected 282 by the intermediary. In one embodiment, the call request is rejected by the intermediary via an HTTP error message generated at the intermediary, which is sent to the HTTP client corresponding to the legacy system from which the rejected call request was received.

In one embodiment, the HTTP error is forwarded by the HTTP client to, and received by, the wrapper program which made the call request and converted by the wrapper into an error format that is recognizable to the legacy program which initially called the wrapper, and the formatted error is forwarded by the wrapper to such legacy program in a manner similar to the manner in which substantive error messages from the translator are processed by the wrapper above 282.

If Permissions and Service Key List are Both Okay, then Intermediary Forwards to Translator, Identifies and Stores Date/Time, Listens for Response and Checks Time.

If the determination is made that the calling legacy system is a system which is permitted to call distributed services via the intermediary and translator, and if the service key included with the call request is also included in the service key list at the intermediary 280, then the received call request is forwarded by the intermediary to the translator, which processes it as described herein, and a response from the distributed service and forwarded by the translator as described herein is listened for by the intermediary 284. In one embodiment, when the call request is forwarded to the translator, the date and time of such forwarding is identified, such as via an operating system clock, and stored by the intermediary, and the date and time are checked by the intermediary, as it is listening for the response from the translator 284.

If Response is not within Threshold Time, then Intermediary Generates its Own HTTP Timeout Error and Sends to Wrapper Via HTTP Client, which Converts to Legacy Program Error and Forwards Error to Legacy Program.

If a response is not received from the translator within a threshold amount of time 286, then an HTTP timeout error is generated by the intermediary, and the HTTP timeout error is sent to the HTTP client of the legacy system from which the call request was initially received 288. In one embodiment, the wrapper that sent the call request to the intermediary receives the HTTP timeout error in response to its request, converts the HTTP timeout error into a format that is recognizable as that type of error to the legacy program which called the wrapper, and forwards the formatted error to such calling legacy program.

If Response is within Threshold Time, then Intermediary Forwards Response to Wrapper Via HTTP Client, which Converts to Legacy Program Format and Forwards Response to Legacy Program.

If a response from the distributed service is received from the translator within a threshold amount of time 286, then the intermediary forwards the received response to the wrapper via the HTTP client from which the call request was initially received, and as described above with respect to step 240 of FIG. 2A and steps 260-264 of FIG. 2B, such response is examined by the wrapper, converted to a format conventional to the legacy program which requested the response, and forwarded to that legacy program 290 as described herein.

System.

Figure 3:
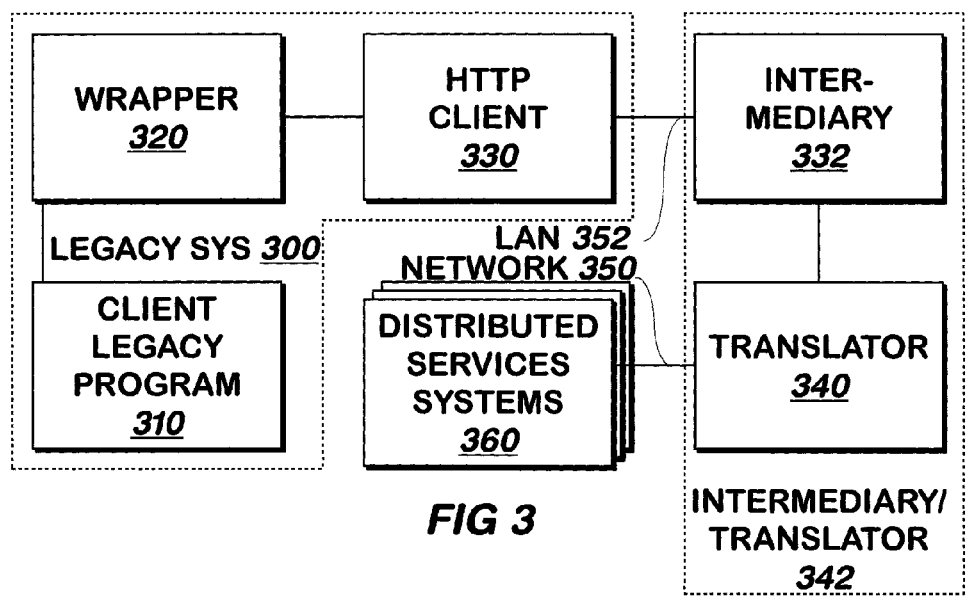
FIG. 3 is a block schematic diagram of a system for allowing legacy systems of a computer system to call distributed systems of a different computer system via a network, such as a LAN or the Internet, according to one embodiment of the present invention.

FIG. 3 is a block schematic diagram of a system for facilitating communications between legacy systems and distributed services systems via a translator according to one embodiment of the present invention.

Figure 4:
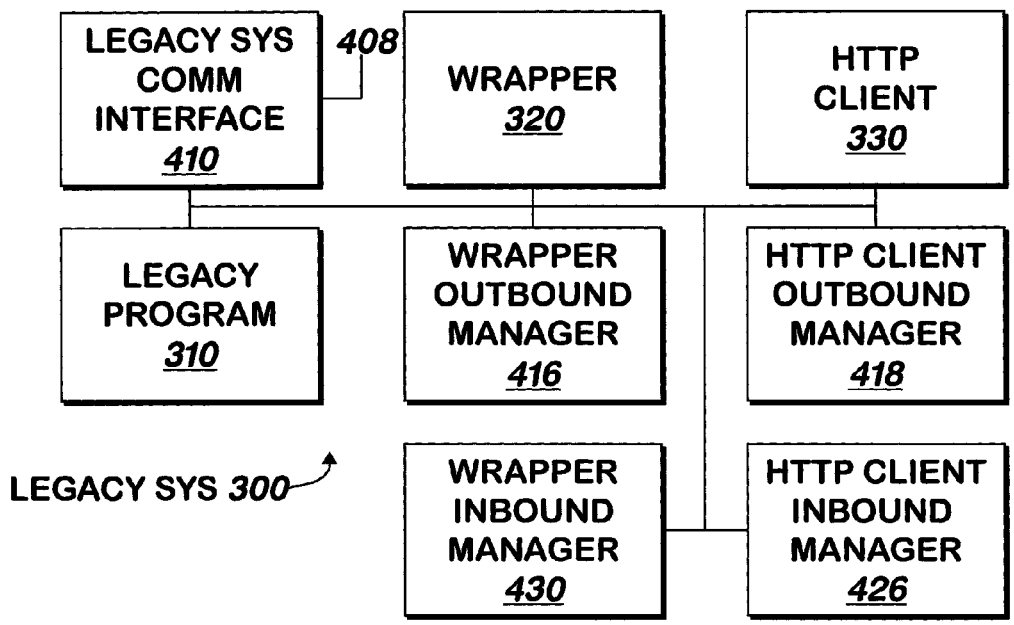
FIG. 4 is a block schematic diagram of legacy system 300 of FIG. 3 shown in more detail according to one embodiment of the present invention.

FIG. 4 is a block schematic diagram of legacy system 300 of FIG. 3 shown in more detail according to one embodiment of the present invention.

Figure 5:
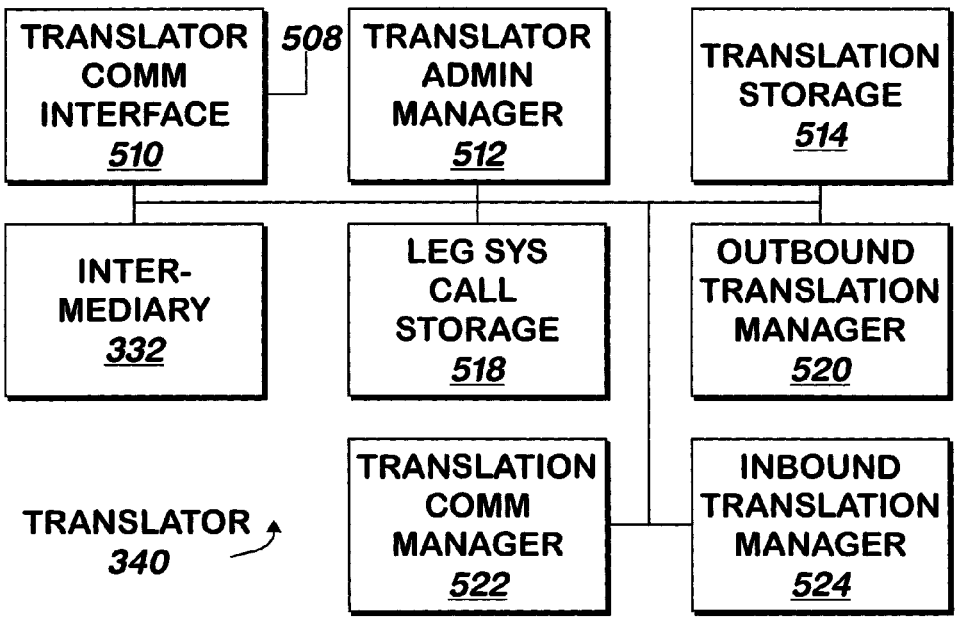
FIG. 5 is a block schematic diagram of translator 340 of FIG. 3 shown in more detail according to one embodiment of the present invention.

FIG. 5 is a block schematic diagram of translator 340 of FIG. 3 shown in more detail according to one embodiment of the present invention.

Figure 6:
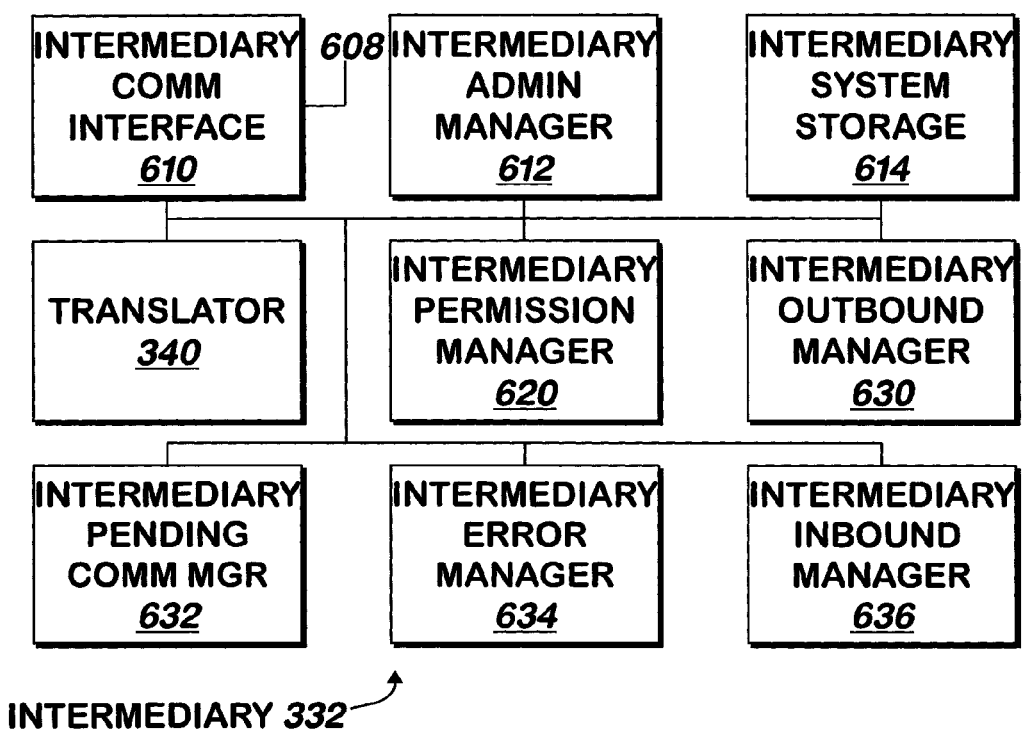
FIG. 6 is a block schematic diagram of intermediary 332 of FIG. 3 shown in more detail according to one embodiment of the present invention.

FIG. 6 is a block schematic diagram of intermediary 332 of FIG. 3 shown in more detail according to one embodiment of the present invention.

Referring now to FIG. 3, in one embodiment, the system of FIG. 3 contains one or more legacy systems 300, which each may include one or more legacy programs 310, a wrapper 320, and an HTTP client 330; a translator 340 and an intermediary 332, which may be part of the same computer systems; and any number of distributed services systems 360 that provide any distributed services, though other arrangements may be used. All systems operate as described herein. Translator 340 and distributed services systems 360 communicate via network 350, which may include a conventional Ethernet network, the Internet, or both. Translator 340 may be coupled to network 350 and intermediary 332 may be coupled to HTTP client 330 via LAN 352, which may include conventional Ethernet network or any other local area network.

Each legacy program 310 may include a client legacy program such as one written in COBOL or another language that makes directly calling distributed services systems 360 difficult, insecure, complex or impossible.

In one embodiment, the elements 310, 320, 330, 332 and 340 may include computer programs that are separate from one another as shown, though other arrangements of computer programs may be used.

Legacy system 300, intermediary/translator 342, and distributed services systems 360 may include separate conventional computer systems with their own unique IP addresses including one or more conventional computers or computer servers, each including a respective communication interface 410, 510, (not shown on system 360) each of which may include a conventional communication interface running suitable communication protocols, such as Ethernet, TCP/IP, or both. Other numbers of servers may be used and other arrangements of computer programs on the computer servers may be used. In one embodiment, unless otherwise noted herein, all communication in and out of each of the systems 300, 342, and 360 are made via its respective input/output 408, 508 (not shown on system 360).

Translator administration manager 512 receives service key information, described above, corresponding to any number of distributed services as described above, and translator administration manager 512 stores such service key information in translation storage 514. In one embodiment, translation administration manager 512 may store service key information as a table indexed by service keys. All storage elements described herein such as translation storage 514 may include conventional memory and/or disk storage and may include a conventional database.

At any time, legacy program 310 of legacy system 300 (e.g. COBOL program on a system of one or more mainframe computers) may determine the need or desire for the use of any distributed service as described above. When legacy program 310 determines that use of a distributed service is specified, legacy program 310 identifies the service key corresponding to the specified distributed service as described above, and legacy program 310 builds any parameters it will provide as input to such specified distributed service into a format or data structure that is conventional to legacy program 310 (e.g. COBOL COPYBOOK) in a manner conventional to legacy program 310. Legacy program 310 calls wrapper 320 using such input parameters, along with the identified service key corresponding to the specified distributed service, as described above. In one embodiment, legacy program 310 may call wrapper 320 via operating system (not shown) of legacy system 300, which signals wrapper 320 with the service key and input parameters when it is called.

Legacy System.

FIG. 4 illustrates the legacy system 300 of FIG. 3 in more detail according to one embodiment of the present invention. Referring now to FIGS. 3 and 4, wrapper outbound manager 416 receives from legacy program 310 the call, including the service key and input parameters, and using a set of internally stored rules, wrapper outbound manager 416 formats the received service key and input parameters into an HTTP message, along with indications of the type or format of the input parameters included and the format or encoding of such HTTP message as described above. In one embodiment, wrapper outbound manager 416 formats the service key into an HTTP header, attaches the legacy program-conventional input parameters to the HTTP header as the HTTP payload, and sends the HTTP message to HTTP client 330 as described above.

HTTP client outbound manager 418 receives the HTTP message and connects to intermediary 332 as described above, and HTTP client outbound manager 418 forwards the HTTP request to intermediary 332, which receives and forwards the request to translator 340 as described in more detail below. As described herein, intermediary 332 may authenticate itself, and/or may be previously authenticated, to legacy system 300, and authenticated intermediary 332 receives and forwards any communications from legacy system 300 to translator 340 and vice versa, as described below.

FIG. 5 illustrates the translator 340 of FIG. 3 in more detail according to one embodiment of the present invention. Referring now to FIGS. 3, 4, and 5, outbound translation manager 520 receives the forwarded HTTP request from intermediary 332 and translates the received input parameters from the format conventional to legacy program 310 into the format specified by the received service key as described above. To translate the received parameters as described above, outbound translation manager 520 identifies the service type corresponding to the received service key in translation storage 514 and also identifies the translation requirements corresponding to such service type in translation storage 514. Using the translated parameters and the service location and protocol to call the distributed service corresponding to the received service key in translation storage 514, outbound translation manager 520 calls distributed service system 360 corresponding to the received service key as described above. In one embodiment, outbound translation manager 520 calls distributed service system 360 in a manner conventional for the distributed service, as described above. In one embodiment, outbound translation manager 520 stores a record of the call to distributed service system 360 in legacy system call storage 518, including a service call identifier, which may include service location information corresponding to distributed service system 360 that is called, as well as to legacy system 300 that called it. As described above, the outbound translation manager 520 may store the service call identifier along with the date and time of when such distributed service call was made, which it retrieves from its operating system (not shown).

Distributed service system 360 corresponding to the requested service key receives the call and attempts to process the call in a manner conventional to the distributed service called or identify any communication or substantive error as described above. If distributed service system 360 identifies a communication error, such as an HTTP resend error as described above, it notifies translation communication manager 522 of such communication error, and translation communication manager 522 receives the error notification and may resend any missing packets or information to distributed service system 360 in any conventional manner.

If distributed service system 360 does not identify any communication error as described above, then it sends a response which may be an expected response or a substantive error, which is any error other than a communication error, in the expected format to inbound translation manager 524 which receives the response. Inbound translation manager 524 identifies the type of translation from the IP address of the distributed service, or identifies the distributed service call corresponding to the received response (for example, using destination and source IP address and port information corresponding to the received response, which may be real IP address or virtual IP addresses), and reverse translates the received response from the format in which it was received from distributed service system 360 into the format specified by the corresponding translation stored in translation storage 514 as described above.

In one embodiment, if inbound translation manager 524 receives a substantive error response, it translates the error from the format it was received into an HTTP format using the translation information received as described above and stored in translation storage 514.

Inbound translation manager 524 provides the reverse translated response (or translated substantive error response) to intermediary 332, which receives the response and forwards it to HTTP client inbound manager 426 as described above. In one embodiment, inbound translation manager 524 provides the reverse translated response to HTTP client inbound manager 426 (via intermediary 332 as described in more detail above and below) as an HTTP message which includes the reverse translated response in the payload of the message.

HTTP client inbound manager 426 receives the HTTP message including the reverse translated response (or HTTP error code) via intermediary 332 and forwards the reverse translated response (or HTTP error code) to wrapper 320 as described above. When HTTP client inbound manager 426 forwards such response to wrapper 320, wrapper inbound manager 430 receives the responses and identifies the type of response received as described above. If wrapper inbound manager 430 identifies the response as a substantive-type error response (i.e. not an HTTP resend-type error or other communication-type error response), then wrapper inbound manager 430 adapts the received error message to a format recognized by legacy program 310 from which the initial call was received, and wrapper inbound manager 430 forwards such adapted error message to legacy program 310 as described above. For example, for legacy program 310 running COBOL, wrapper inbound manager 430 may translate an HTTP error code (not an HTTP resend error) to a COBOL error code in a manner used to communicate substantive errors among COBOL programs, and forward such COBOL error code to legacy program 310.

If wrapper inbound manager 430 does not identify the received response as a substantive-type error message as described above, then wrapper inbound manager 430 forwards the reverse translated response to legacy program 310, which receives the reverse translated response and incorporates it into an output of that program.

As described above, communications from legacy systems 300 to translator 340 and vice versa may be forwarded between the two systems via intermediary 332. FIG. 6 is a block schematic diagram of a representative intermediary 332 of FIG. 3 shown in more detail according to one embodiment of the present invention. Referring now to FIGS. 3-6, at any time, intermediary administration manager 612 receives digital certificate information including public and private keys corresponding to intermediary 332, and also receives any public key information corresponding to any number of legacy systems 300 via conventional digital certificate techniques or digital certificate exchange techniques, and intermediary administration manager 612 stores such information in intermediary system storage 614.

Intermediary administration manager 612 also receives caller permissions and service key list information, described above, such as from a system administrator, and intermediary administration manager 612 stores such information in intermediary system storage 614. In one embodiment, intermediary administration manager 612 may receive caller permissions as a list of legacy system identifiers, which may be IP addresses (real or virtual) and port numbers or host IDs or otherwise as described above, and an indication as to whether distributed system calls are available to be made from such legacy system 300, and may receive service key list information as a list of distributed service keys which correspond to distributed services that are available to be called by legacy systems 300 via translator 340 in the manner described above.

Using the digital certificate information stored in intermediary system storage 614, communication interface 610 establishes one or more secure connections with communication interface 410 corresponding to any number of legacy systems 300 via conventional public/private key techniques. The legacy systems 300 may initiate such connections. Once such a secure connection has been established with a legacy system 300 of FIG. 3, communication interface 610 may receive a call request via such secure connection as described above. As described above, a call request or call to a distributed service system 360 from a legacy system 300 is received as an HTTP message and includes a service key (HTTP header) and parameters (HTTP payload).

When communication interface 610 receives a call request as described above, it identifies the legacy system 300 that sent the call request, such as via the secure connection through which it received the request and/or other source location information corresponding to the received call request, and provides the call request to intermediary permission manager 620, including the source IP address and port information, which may include a real IP address or a virtual IP address or a host ID, from which the call request was received.

Intermediary permission manager 620 receives the call request and checks the information in intermediary system storage 614 to determine whether legacy system 300 from which the request was received is permitted to make calls to distributed services via translator in the manner described above, and intermediary permission manager 620 also identifies the service key included with the call request, and checks service key list information for the received service key as described above. In one embodiment, communication interface 610 retrieves caller permissions information and service key list information from intermediary system storage 614.

If intermediary permission manager 620 determines that legacy system 300 from which the call request was received is not a system from which calls to distributed services are permitted, or if intermediary permission manager 620 does not successfully match the received service key with an entry on the service key list in intermediary system storage 614, then intermediary permission manager 620 rejects the received call request by building an appropriate HTTP error message and sending, in response to such received call request, the HTTP error message to HTTP client 330 from which the call request was received, for example, using the original source location information corresponding to the call request. As described above, HTTP client 330 receives the HTTP error message and forwards the error message to wrapper 320, which receives the response to its call request, converts the received response into the format recognizable to legacy program 310, and forwards the formatted response to legacy program 310.

If intermediary permission manager 620 determines that legacy system 300 from which the call request was received is a system from which calls to distributed services are permitted, and if intermediary permission manager 620 also successfully identifies the received service key in the service key list in intermediary system storage 614, then intermediary permission manager 620 provides the call request to intermediary outbound manager 630.

Intermediary outbound manager 630 receives the call request, stores the source location information (e.g. IP address and port number or host ID) corresponding to the call request, forwards the call request to translator 340 supplying different IP address and port number information as the source location of the call request, and logs the date and time of when the call request was forwarded as such in intermediary pending communication storage 632. In one embodiment, intermediary outbound manager 630 uses conventional Network Address Translation (NAT) techniques to assign a disguised version of the source location of the call request to use to send such request to the distributed services system 360. For example, intermediary outbound manager 630 may assign a port number or any other index to the call request and include the IP address of intermediary/translator 342 and the assigned port number as the source IP address and port number of the forwarded call request. Intermediary outbound manager 630 stores or overwrites as such information in a circular buffer in intermediary pending communication storage 632 as a log entry of the forwarded call request, including the actual source IP address and port number or host ID corresponding to legacy system 300 from which the call request was received, the service key included in the call request, and the date and time of when such call request was forwarded to translator 340 using the alternate IP address and port number, the alternate IP address and port number used, and the payload of the request. In one embodiment, intermediary pending communication storage 632 includes a conventional circular buffer data structure. Intermediary outbound manager 630 signals translator 340 with an index of the information in the buffer.

Translator 340 receives the forwarded call request and processes the call request as described above, sending it using the disguised IP address assigned as described above.

Intermediary inbound communication manager 636 listens for any response from translator 340, and if any such response is received, intermediary inbound communication manager 636 identifies in the buffer in intermediary pending communication storage 632 the assigned port number or other assigned index corresponding to the received response. Intermediary inbound communication manager 636 marks the log entry in intermediary pending communication storage 632 corresponding to such received port number as responded to, or otherwise stores an indication associated with such index that a response has been received corresponding to the index. Intermediary inbound communication manager 636 also identifies legacy system 300 from which the original call request corresponding to such index was received, such as via the source location stored corresponding to such received index, and intermediary inbound communication manager 636 forwards the response received from translator 340 to HTTP client 330 at such identified location, as described above.

As described above, HTTP client 330 receives the response and forwards the response to wrapper 320, which receives the response, converts the received response into the format recognizable to legacy program 310 that originally called it, and forwards the formatted response to such legacy program 310.

Intermediary error manager 634 occasionally retrieves the current date and time from an operating system (not shown), checks log entries in intermediary pending communication storage 632 for any recent entries which have not been marked as responded and for which the amount of time that has elapsed since the date and time when the call request corresponding to such log entry was forwarded to translator 340 and the current date and time exceeds a threshold amount of time as described above. In one embodiment intermediary error manager 634 may check log entries at regular intervals, such as every second or every two seconds, or at any other intervals.

If intermediary error manager 634 identifies any such log entry corresponding to a call request that has timed out as described above, then intermediary error manager 634 generates an HTTP timeout error message and sends the HTTP timeout error message to HTTP client 330 from which the original call request corresponding to such log entry was received as described above. In one embodiment, intermediary error manager 634 sends the HTTP timeout error message addressed to the source location corresponding to such identified log entry.

HTTP client 330 receives the HTTP timeout error message and forwards the message to wrapper 320, which receives the HTTP timeout error in response to its call request, converts the received response into the format recognizable to legacy program 310 which called it, and forwards the formatted response to such legacy program 310 as described above.

What is claimed is:

1. A method of calling from a first computer program on a first computer system, a second computer program on a second computer system, comprising:
   receiving by a third computer program, for each of a plurality of other computer programs comprising the second computer program, at least one service key, a location of the second computer system and parameter format translation information that describes how to translate at least some parameters output by the first computer program in a received format into a different format used by the other computer program;
   receiving a call at the third computer program from the first computer program in a manner used when the first computer program and the third computer program are written in a same computer programming language, using the at least one service key of the second computer program and a set of at least one parameter in a first format used for program to program communications when both said programs are written in said computer programming language;
   responsive to the at least one service key, translating, by a hardware processor operating the third computer program, the set of at least one parameter into a second format different from the first format;
   providing the set of at least one parameter in the second format from the third computer program to the second computer program; and
   responsive to the second computer program providing a response:
      receiving at the third computer program the response from the second computer program to the provided set of at least one parameter;
      providing to a fourth computer program a third program response, responsive to the response received from the second computer program;
      at the fourth computer program, identifying whether at least some of the third program response comprises an error;
      responsive to the at least some of the third program response comprising the error, reformatting at the forth computer program, at least some of the third program response to indicate an error in a manner used by the same programming language or a communication protocol, and providing at least some of the reformatted third program response to the first computer program; and
      responsive to the at least some of the third program response not comprising the error,
   reformatting at the fourth computer program the at least some of the third program response for said same programming language and providing the reformatted third program response to the first computer program.

2. The method of claim 1, wherein the first computer program, second computer program and third computer program each run on a different computer system coupled to one another by at least one computer network.

3. The method of claim 2, wherein the fourth computer program runs on the first computer system.

4. The method of claim 1, wherein the fourth computer program identifies or reformats responsive to an identifier corresponding to the second computer program.

5. The method of claim 1:
   wherein:
      the calling the third computer program by the first computer program is performed via at least a fifth computer program, and
      responsive to the second computer program providing the response, the response between the second computer program and the first computer program is provided via the fifth computer program; and
   additionally comprising, responsive to the second computer program not providing the response within a threshold amount of time from when the set of at least one parameter in the second format is provided from the fifth computer program to the second computer program, providing by the fifth computer program, a timeout error to the first computer program.

6. The method of claim 1, wherein the set of at least one parameter in the second format is provided from the third computer program to the second computer program responsive to permission granted by a fifth computer program, said permission responsive to a characteristic of the second computer program.

7. A system for calling from a first computer program on a first computer system, a second computer program on a second computer system, comprising:

a translator comprising a hardware processor for receiving at an input, for each of a plurality of other computer programs comprising the second computer program, at least one service key, a location of the second computer system and parameter format translation information that describes how to translate at least some parameters output by the first computer program in a received format into a different format used by at least one of the plurality of other computer programs, and a call having a manner used when the first computer program and the translator are written in a same computer programming language, the call comprising the at least one service key of the second computer program and a set of at least one parameter in a first format used for program to program communications when both said programs are written in said computer programming language, the translator for, responsive to the at least one service key, translating the set of at least one parameter into a second format different from the first format, and providing at an output the set of at least one parameter in the second format to the second computer program, and, responsive to the second computer program providing a response, for receiving at the translator input the response from the second computer program to the provided set of at least one parameter and providing at the translator output a program response, responsive to the response received from the second computer program; and a wrapper having an input coupled to the translator output for receiving the program response, the wrapper for:

identifying whether at least some of the program response comprises an error, and, responsive to the at least some of the program response comprising the error, reformatting at least some of the program response to indicate an error in a manner used by the same programming language or a communication protocol, and providing to the first computer program at an output coupled to the first computer program at least some of the reformatted program response;

responsive to the at least some of the program response not comprising the error, reformatting the at least some of the program response for said same programming language and providing the reformatted program response to the first computer program.

8. The system of claim 7, wherein the first computer program, second computer program and translator each run on a different computer system coupled to one another by at least one computer network.

9. The system of claim 8, wherein the wrapper runs on the first computer system.

10. The system of claim 7, wherein the wrapper identifies or reformats responsive to an identifier corresponding to the second computer program.

11. The system of claim 7:
additionally comprising an intermediary;
wherein:
the call is received via at least an intermediary via an input/output, and
responsive to the second computer program providing the response, the response between the second computer program and the first computer program is provided via the intermediary; and
the intermediary is additionally for, responsive to the second computer program not providing the response within a threshold amount of time from when the set of at least one parameter in the second format is provided from the intermediary to the second computer program, providing via the intermediary input/output a timeout error to the first computer program.

12. The system of claim 7:
additionally comprising an intermediary; and
wherein the set of at least one parameter in the second format is provided from the translator to the second computer program responsive to permission granted by an intermediary, said permission responsive to a characteristic of the second computer program.

13. A computer program product comprising a non-transitory computer useable medium having computer readable program code embodied therein for calling from a first computer program on a first computer system, a second computer program on a second computer system, the computer program product comprising computer readable program code devices configured to cause a computer system to:

receive by a third computer program, for each of a plurality of other computer programs comprising the second computer program, at least one service key, a location of the second computer system and parameter format translation information that describes how to translate at least some parameters output by the first computer program in a received format into a different format used by the other computer programs;

receive at a third computer program a call from the first computer program in a manner used when the first computer program and the third computer program are written in a same computer programming language, using the at least one service key of the second computer program and a set of at least one parameter in a first format used for program to program communications when both said programs are written in said computer programming language;

responsive to the at least one service key, translate at the third computer program the set of at least one parameter into a second format different from the first format;

provide the set of at least one parameter in the second format from the third computer program to the second computer program; and responsive to the second computer program providing a response:

receive at the third computer program the response from the second computer program to the provided set of at least one parameter;

provide to a fourth computer program a third program response, responsive to the response received from the second computer program;

at the fourth computer program, identify whether at least some of the third program response comprises an error;

responsive to the at least some of the third program response comprising the error, reformat at the forth computer program, at least some of the third program response to indicate an error in a manner used by the same programming language or a communication protocol, and provide at least some of the reformatted third program response to the first computer program; and responsive to the at least some of the third program response not comprising the error, reformat at the fourth computer program the at least some of the third program response for said same programming language and provide the reformatted third program response to the first computer program.

14. The computer program product of claim 13, wherein the first computer program, second computer program and third computer program each run on a different computer system coupled to one another by at least one computer network.

15. The computer program product of claim 14, wherein the fourth computer program runs on the first computer system.

16. The computer program product of claim 13, wherein the fourth computer program identifies or reformats responsive to an identifier corresponding to the second computer program.

17. The computer program product of claim 13:
wherein:
the calling the third computer program by the first computer program is performed via at least a fifth computer program, and
responsive to the second computer program providing the response, the response between the second computer program and the first computer program is provided via the fifth computer program; and
additionally comprising computer readable program code devices configured to cause the computer system to, responsive to the second computer program not providing the response within a threshold amount of time from when the set of at least one parameter in the second format is provided from the fifth computer program to the second computer program, provide by the fifth computer program, a timeout error to the first computer program.

18. The computer program product of claim 13, wherein the set of at least one parameter in the second format is provided from the third computer program to the second computer program responsive to permission granted by a fifth computer program, said permission responsive to a characteristic of the second computer program.

* * * * *